(12) United States Patent
Minotti et al.

(10) Patent No.: US 8,058,772 B2
(45) Date of Patent: Nov. 15, 2011

(54) METHOD AND DEVICE FOR MOVING AN ELEMENT TO BE DRIVEN USING AN ACTUATING ELEMENT FORMED BY ETCHING IN A SEMICONDUCTOR MATERIAL

(75) Inventors: Patrice Minotti, Gennes (FR); Gilles Bourbon, Besancon (FR); Patrice Le Moal, Besancon (FR); Eric Joseph, Chaucenne (FR)

(73) Assignee: Silmach, Besancon (FR)

( * ) Notice: Subject to any disclaimer, the term of this patent is extended or adjusted under 35 U.S.C. 154(b) by 108 days.

(21) Appl. No.: 11/886,504

(22) PCT Filed: Mar. 16, 2006

(86) PCT No.: PCT/EP2006/060806
§ 371 (c)(1),
(2), (4) Date: Sep. 17, 2007

(87) PCT Pub. No.: WO2006/097516
PCT Pub. Date: Sep. 21, 2006

(65) Prior Publication Data
US 2009/0096323 A1    Apr. 16, 2009

(30) Foreign Application Priority Data
Mar. 18, 2005  (FR) ...................................... 05 02700

(51) Int. Cl.
*H02N 2/12* (2006.01)
(52) U.S. Cl. .............. 310/323.02; 310/309; 310/323.08; 310/323.09

(58) Field of Classification Search .................. 310/309, 310/323.02, 323.09, 323.08
See application file for complete search history.

(56) References Cited

U.S. PATENT DOCUMENTS

| | | | |
|---|---|---|---|
| 3,465,805 A * | 9/1969 | Lyman | 160/23.1 |
| 6,211,111 B1 | 4/2001 | Chen et al. | |
| 6,313,562 B1 | 11/2001 | Barnes et al. | |
| 6,354,922 B1 * | 3/2002 | Sakurai et al. | 451/67 |
| 6,465,929 B1 | 10/2002 | Levitan et al. | |
| 6,646,364 B1 * | 11/2003 | Horning et al. | 310/309 |
| 6,729,856 B2 * | 5/2004 | Cabuz et al. | 417/322 |
| 2004/0159813 A1 | 8/2004 | Sherman et al. | |
| 2006/0045722 A1 * | 3/2006 | Hashimoto | 414/754 |
| 2007/0069604 A1 * | 3/2007 | Bourbon et al. | 310/309 |

FOREIGN PATENT DOCUMENTS

| | | |
|---|---|---|
| FR | 2 809 549 A | 11/2001 |
| FR | 2 852 111 A | 9/2004 |
| WO | WO 01/09519 A | 2/2001 |

* cited by examiner

*Primary Examiner* — Walter Benson
*Assistant Examiner* — Bryan Gordon
(74) *Attorney, Agent, or Firm* — Pauley Petersen & Erickson

(57) ABSTRACT

The invention concerns an element to be driven, a driving element designed to be urged into engagement with the element to be driven and an actuating element adapted to move the driving element so that it drives the element to be driven in step-by-step displacement, the driving element and the actuating element being formed by etching in a semiconductor material wafer. The invention is characterized in that it comprises elastic prestressing means for maintaining the driving element in contact with the element to be driven.

29 Claims, 3 Drawing Sheets

METHOD AND DEVICE FOR MOVING AN ELEMENT TO BE DRIVEN USING AN ACTUATING ELEMENT FORMED BY ETCHING IN A SEMICONDUCTOR MATERIAL

BACKGROUND OF THE INVENTION

1. Field of the Invention

The invention relates to the field of microelectromechanical systems (MEMS).

Such microelectromechanical systems can be formed by etching in blocks or wafers made of semiconductor material, generally silicon.

2. Discussion of Related Art

The document FR 2 852 111 (published on 10 Sep. 2004) describes a clock-making device comprising a toothed wheel, a driving element for meshing sequentially with the toothed wheel and an actuator adapted to move the driving element according to hysteresis movement such that the driving element meshes with successive teeth of the wheel. In such a device, all the elements (toothed wheel, driving element, and actuator) are formed by microetching in the same block made of semiconductor material. The precision of the relative positioning of the elements is determined by the precision with which the block is etched.

It is preferred to connect a driving device formed by microetching in a wafer and a driven element made by means of any alternating or alternative technology (clock-making, micromolding, machining by electroerosion or other technology).

This hybrid approach would use a standard driving device and link it to a driven element adapted to a particular application, for example an entry wheel for a reduction mechanism for a watch or clock, a cogged discoid rotor of a step-by-step rotary micromotor, or a rack of a linear engine.

This would also simultaneously create a large number of drive devices in the same block of semiconductor material (wafer).

However, when the driving device and the driven element are being connected, the relative positioning of the driving device and of the driven element is delicate. In fact, the uncertainty of positioning due for example to the manufacturing precision of the driven element and the mechanical clearances can in certain cases be greater than the amplitude of mechanical oscillations of the movement of the driving element. The result is that the driving element does not mesh with the element to be driven and the device does not function.

SUMMARY OF THE INVENTION

An object of the invention is to provide a device allowing the driving of the element to be driven, in spite of the positioning uncertainties relative of the driven element vis-à-vis the driving device.

This object is attained by the present invention by a device comprising an element to be driven, a driving element to be engaged with the element to be driven and an actuating element adapted to move the driving element so that it drives the element to be driven according to a step-by-step movement, the driving element and the actuating element being formed by etching in a wafer made of semiconductor material, characterized in that it comprises elastic prestressing device or means for maintaining the driving element in contact with the element to be driven.

The elastic device or means keep the driving element in contact with the element to be driven and thus compensate for defects in positioning of the wafer relative to the element to be driven.

The device of the invention can also have the following characteristics:

the elastic device or means extend between the actuating element and the driving element, the elastic device or means comprise a flexible blade connecting the driving element to the actuating element, the device comprises a support on which the wafer and the element to be driven are arranged, the device comprises positioning pins fixed on the support allowing positioning of the wafer on the support, the wafer is arranged in support on positioning pins, the wafer has at least one notch formed on an edge of the wafer, the notch being able to receive a positioning pin for positioning the wafer on the support, the actuating element comprises a first actuating module adapted to move the driving element according to a first direction to drive the element to be driven and a second actuating module adapted to move the driving element in a second direction to move the driving element away from the element to be driven, the actuating modules being able to be controlled simultaneously to generate a combine hysteresis movement of the driving element.

the second actuating module comprises an electrode and a flexible rod, the electrode being able to be controlled to deform the flexible rod so as to shift the driving element in a second direction to move the driving element away from the element to be driven, the electrode has a convex lateral surface, preferably parabolic, extending opposite a portion of the flexible blade, the second actuating module comprises a series of stops arranged along a lateral surface of the electrode, the stops being able to prevent contact between the blade and the electrode.

The invention also proposes a process for installing a device comprising or consisting of arranging on the same support:

an element to be driven, a wafer made of semiconductor material in which are formed by etching a driving element to be engaged with the element to be driven and an actuating element adapted to move the driving element so that it drives the element to be driven according to a step-by-step movement relative to the support, characterized in that it comprises maintaining the driving element in contact with the element to be driven by way of elastic means or an elastic device.

The process can have the following characteristics:

the device comprising positioning pins fixed on the support, the process comprises arranging the wafer in support on positioning pins, the wafer having at least one notch formed on an edge of the wafer, the process comprises positioning a pin in the notch for positioning the wafer on the support.

BRIEF DESCRIPTION OF THE DRAWINGS

Other characteristics and advantages will emerge from the following description, which is purely illustrative and non-limiting and must be considered with respect to the attached figures, in which.

DETAILED DESCRIPTION OF THE INVENTION

Figure 1:
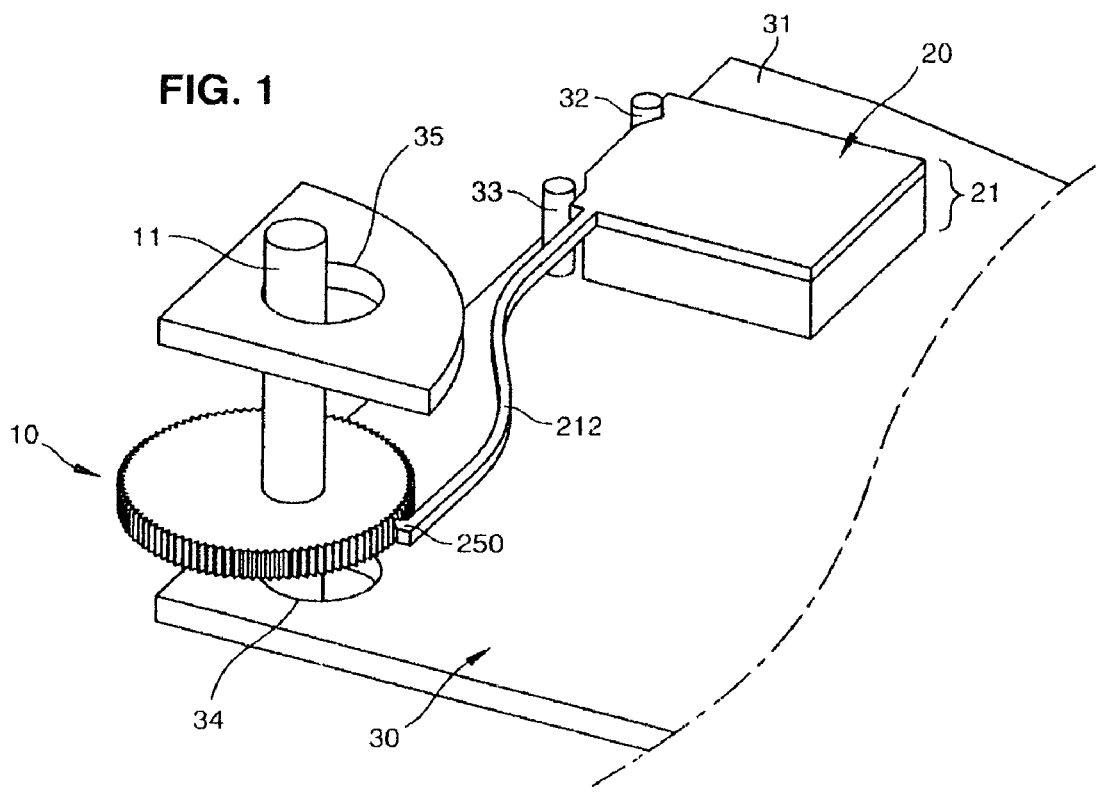
FIG. 1 schematically illustrates, in perspective, a device according to a first embodiment of the invention, FIG. 2 schematically illustrates, in plan view, a device according to the first embodiment of the invention, FIG. 3 schematically illustrates, in plan view, a device according to a second embodiment of the invention, when the wafer is not yet positioned relative to the element to be driven, FIG. 4 schematically illustrates, in plan view, a device according to the second embodiment of the invention, once the wafer has been positioned relative to the element to be driven, FIG. 5 schematically illustrates an electrode to be utilized in the device shown in FIGS. 3 and 4.
Figure 2:
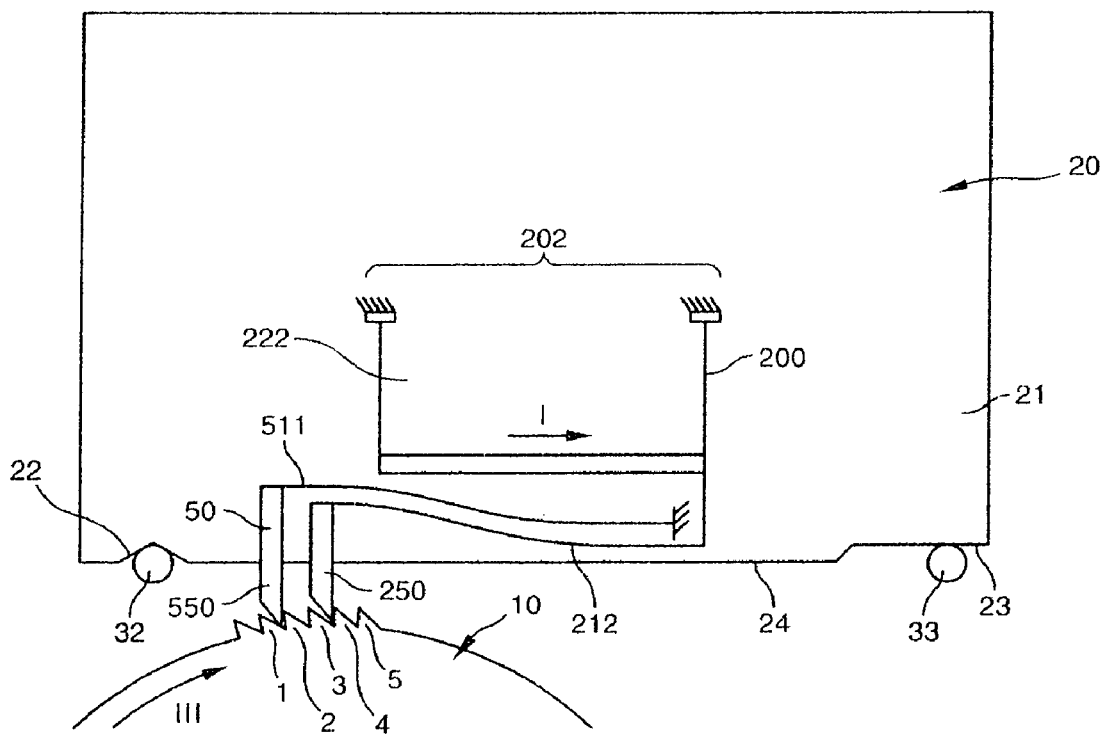

In FIGS. 1 and 2, the device, according to a first embodiment of the invention, comprises a driven element 10, a driving device 20 and a support 30.

The support 30 comprises a planar reception surface 31 on which are placed the element to be driven 10 and the driving device 20.

The element to be driven 10 comprises a toothed wheel of general cylindrical shape. The toothed wheel comprises a denture composed of asymmetrical teeth 1, 2, 3, 4, 5 and a substantially cylindrical shaft 11.

The support 30 comprises orifices 34, 35 of a general cylindrical shape, for receiving the shaft 11. The orifices 34 and 35 form bearings for guiding the shaft 11 in rotation.

The driving device 20 comprises a wafer 21 made of semiconductor material, such as silicon. The driving device 20 comprises an actuating element 200, an indexing element 50 (not shown in FIG. 1) and a driving element 250, formed by microetching in the wafer 21.

The driving element 250 is in the form of a tooth having a triangular shape. The tooth extends in the vicinity of the wheel 10 with the point directed towards the wheel 10, in a radial direction relative to the wheel. The driving element 250 is thus able to mesh with the teeth 1, 2, 3, 4, and 5 of the wheel 10.

The actuating element 200 is mainly made up of a tangential elementary actuating module 202 and an indexing module 50.

The tangential actuating module 202 comprises an interdigitized comb structure 222 (known as a "comb drive") and a flexible blade 212 extending in a general tangential direction relative to the wheel 10. The driving element 250 is connected by the tangential blade 212 to the interdigitized comb structure 222.

When the tangential actuating module 202 is controlled by an alternating addressing or control signal, the tangential actuating module 202 generates an alternative movement in a tangential direction (arrow I).

The indexing module 50 comprises a flexible blade 511 extending in a tangential direction relative to the wheel 10 and an indexing element 550. The flexible blade 511 extends in overhang from the substrate and is flexible in a radial direction relative to the wheel 10. The flexible blade 511 supports at its free end the indexing element 550. The indexing element 550 is in the form of a tooth having a triangular shape. The tooth extends near the wheel 10 with the point directed towards the wheel 10, in a radial direction relative to the wheel. The indexing element 550 is thus able to engage with the teeth 1, 2, 3, 4, and 5 of the wheel 10.

The device, according to the first embodiment of the invention, also comprises two positioning pins 32 and 33 fixed on the support 30. The positioning pins 32 and 33 have a general cylindrical form and extend in a direction perpendicular to the receiving surface 31 of the support 30.

The wafer 21 has two notches 22 and 23 formed on an external edge 24 of the wafer. The notches 22 and 23 are arranged on either side of the driving element 250. The notch 22 is intended to receive the first positioning pin 32 and the notch 23 is intended to receive the second positioning pin 33 for positioning the wafer 21 on the support 30. The positioning pins 32 and 33 define a single position of the wafer 21 on the receiving surface 31 of the support 30.

The first notch 22 has a general V shape. The notch 22 has two support faces forming between them an angle of 120°. Each support face of the first notch 22 is intended to be supported on the cylindrical surface of the pin 32.

The second notch 23 has a single support face, parallel to the edge 24 of the wafer 21, intended to be supported on the cylindrical surface of the pin 33.

The positioning pins 32 and 33 cooperate with the notches 22 and 23 to define a position of the wafer 20 on the receiving surface 31 of the support 30. The positioning pins 32 and 33 thus form reference pins having the function to wedge the driving device parallel to the receiving surface 31.

Installing the device comprises the following steps.

According to a first installation step, the wheel 10 is mounted to rotate on the support 30. To this end, the shaft 11 is mounted on the bearings 34 and 35 such that the wheel 10 solid with the shaft 11 is free to revolve about an axis of rotation perpendicular to the receiving surface 31.

According to a second installation step, the wafer 21 is placed in support on the first and second pins 32 and 33.

The pins 32 and 33 are arranged on the support 30 such that the driving element 250 comes into contact with the wheel 10.

The driving element 250 is kept in contact with the wheel 10 by means of the tangential blade 212. The blade 212 extends in overhang from the interdigitized comb structure 222 and is flexible in a radial direction relative to the wheel 10. Due to the elasticity of the blade 212, the driving element 250 is biased toward and held meshed with the wheel 10.

The flexible blade 212 absorbs the positioning defects of the wafer 21 relative to the element to be driven 10.

In particular, as is evident in FIG. 1, the wheel 10 is mounted on a shaft 11 guided by the bearings 34, 35. The position of the wheel relative to the support 30 is subject to uncertainties associated with the machining tolerances of all the pieces of the device, especially:

the geometric defects of the wheel 10 and of the shaft 11 (e.g., defects in cylindricity and concentricity of the wheel, defects in rectitude of the shaft 11), positioning defects of the bores receiving the guide bearings 34, 35 of the shaft 11, mechanical installation clearances of the wheel 10 on the shaft 11 and guide clearances between the bearings 34, 35 and the shaft 11.

Also, the uncertainties in positioning of the wafer 21 relative to the wheel 10 also result from positioning defects of the positioning pins 32 and 33 on the support 30.

The device functions as follows.

The tangential actuating module 202 is controlled by an alternating addressing or control signal.

During a first alternation of the movement generated by the tangential actuating module 202, the driving element 250 meshes with the wheel 10 and drags the wheel 10. The indexing element 550 crosses a tooth of the wheel 10.

During a second alternation in the opposite direction generated by the tangential actuating module 202, the indexing element 550 blocks the wheel 10 and the driving element 250 slips on the wheel 10.

The wheel 10 is thus driven according to a step-by-step rotation movement (arrow III) by the driving element 250.

The indexing element 50 forms an anti-return mechanism which prevents rotation of the wheel 10 in the inverse direction.

Figure 3:
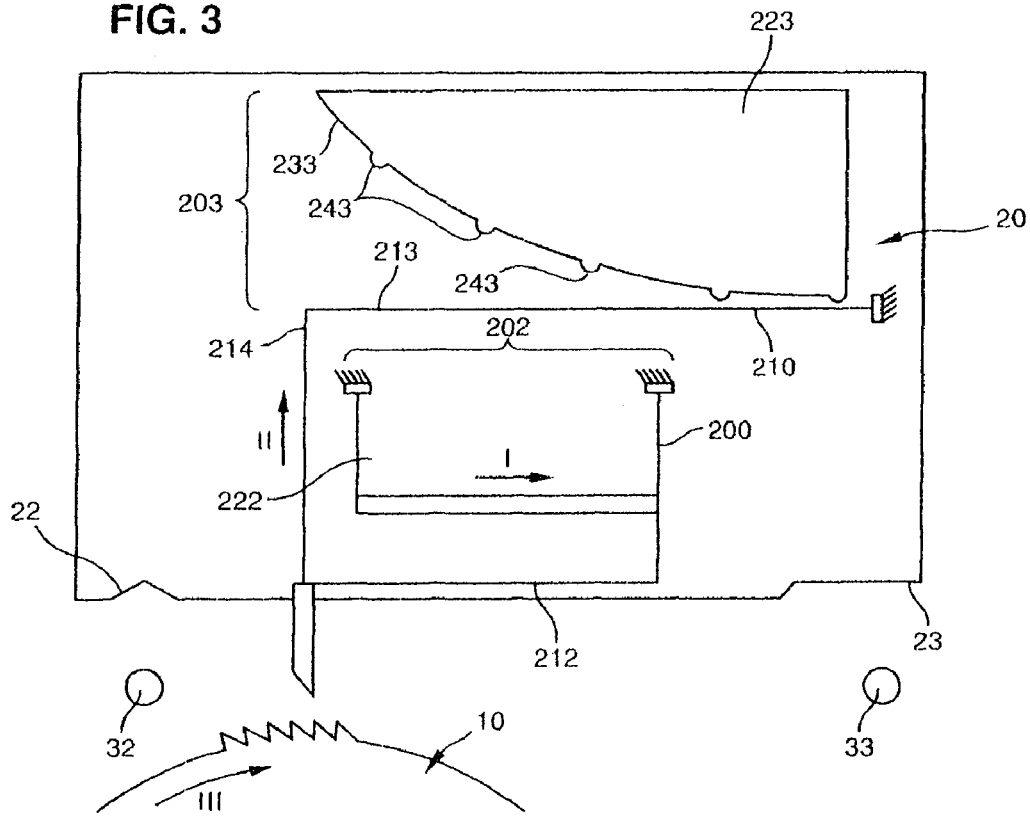
Figure 4:
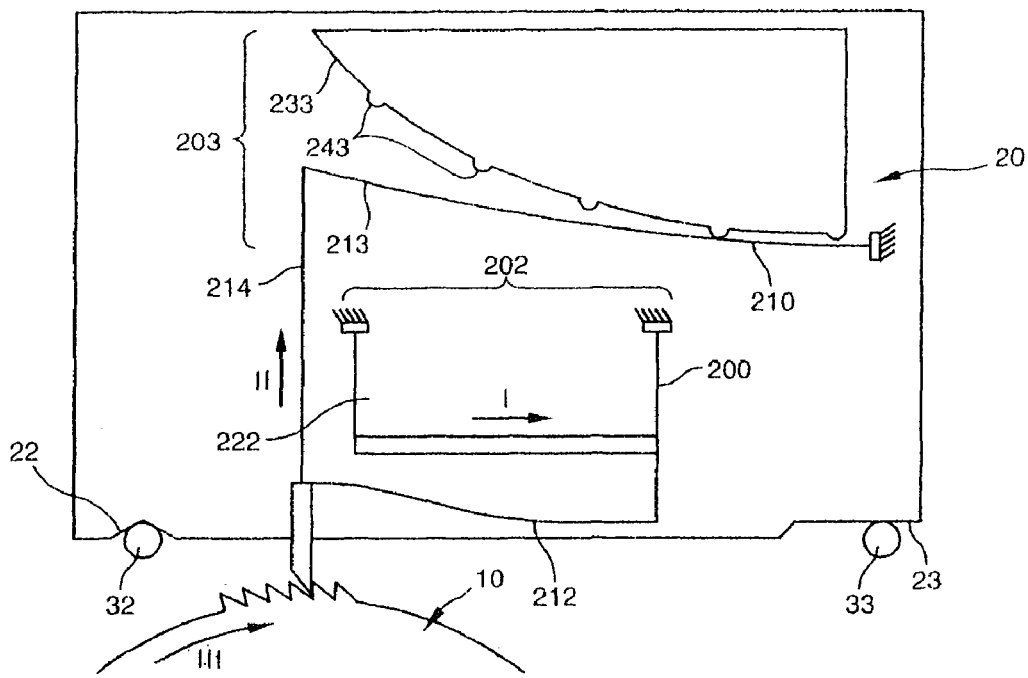

FIGS. 3 and 4 show a device according to a second embodiment of the invention. The installation is identical to the installation of the first embodiment, except that the actuating element 200 comprises an actuating module radial 203.

The device comprises a driven element 10, a driving device 20 and a support 30.

The element to be driven 10 comprises a wheel, optionally toothed.

The driving device 20 comprises a wafer 21 made of semiconductor material, such as silicon. The driving device 20 comprises an actuating element 200 and a driving element 250 formed by microetching in the wafer 21.

In this second embodiment, the actuating element 200 is mainly composed of a tangential elementary actuating module 202 and an elementary radial actuating module 203.

In a variant (not shown), it is also feasible to form an indexing element in the wafer 21.

The tangential actuating module 202 comprises an interdigitized comb structure 222 and a flexible blade 212 extending in a general tangential direction relative to the wheel 10. The driving element 250 is connected by the tangential blade 212 to the interdigitized comb structure 222.

When the tangential actuating module 202 is controlled by an alternating addressing or control signal, the tangential actuating module 202 generates an alternative movement in a tangential direction (arrow I).

The actuating module radial 203 comprises an electrode 223, a flexible blade 210 and stops 243.

The flexible blade 210 has a general L shape and comprises a first branch 213 and a second branch 214.

The first branch 213 extends in a tangential direction relative to the wheel 10. The first branch 213 extends in overhang from the substrate and is flexible in a radial direction relative to the wheel 10.

The second branch 214 extends in a general radial direction relative to the wheel and connects the free end of the first branch 213 to the driving element 250.

Figure 5:
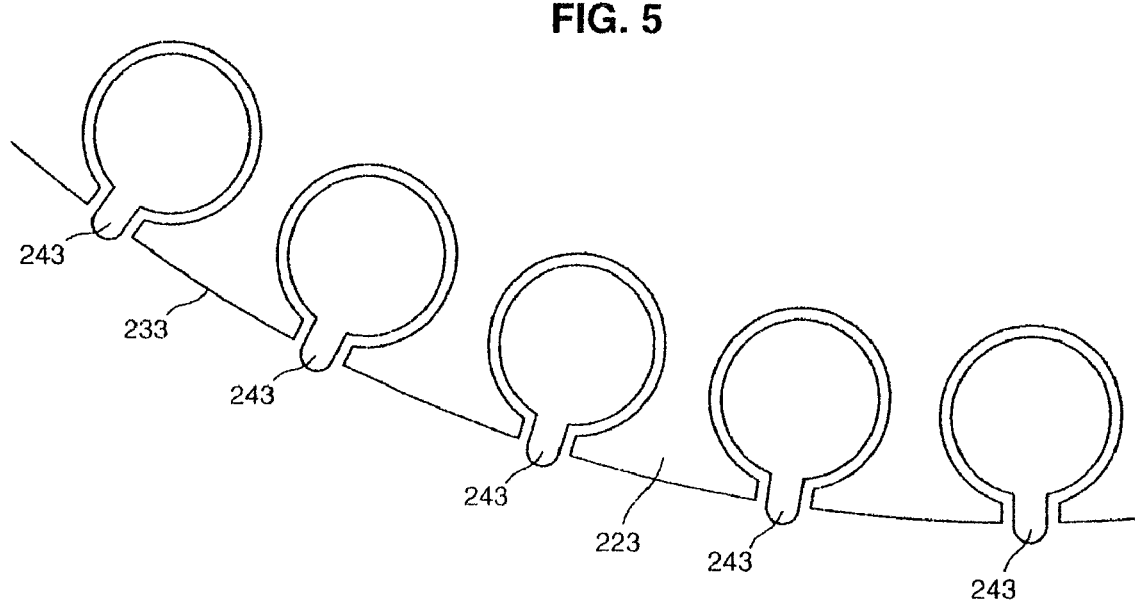

The electrode 223 is illustrated in greater detail in FIG. 5. The electrode 223 has a lateral surface 233 of general convex shape, preferably parabolic. The stops 243 are arranged at regular intervals along the lateral surface 233. The stops 243 are formed by pins etched in the wafer 21. The pins are electrically insulated from the electrode 223.

When voltage is applied to the electrode 223, this voltage creates a difference in potential between the electrode 223 and the blade 210. An electric field is established between the electrode 223 and the blade 210. This electric field generates an electrostatic force which tends to unite the branch 213 of the surface 233 of the electrode 223. This electrostatic force causes deformation of the branch 213 and consequently translation of the driving tooth 250 in a radial direction relative to the wheel 10.

The stops 243 limit the amplitude of the movement of the blade 210 for maintaining the blade 210 at a distance from the electrode 223 and prevent the first branch 213 from coming into contact with the lateral surface 233 of the electrode 223. In fact, contact by the blade 210 and the electrode 223 fed by different voltages would cause a short-circuit likely to cause the device to breakdown.

The convex form of the surface 233 of the electrode controls the movement of the rod 210, irrespective of the initial deformation of the branch 213 due to positioning of the driving tooth 250 relative to the wheel 10.

The branch 213 of the blade 210 thus compensates for uncertainties in positioning of the wafer relative to the wheel 10.

When the tangential actuating module 202 is controlled by an alternating addressing or control signal, the tangential actuating module 202 generates an alternative movement in a tangential direction (arrow I) relative to the wheel 10.

When the electrode 223 of the actuating module radial 203 is controlled by an alternating addressing or control signal, the radial actuating module 203 generates an alternating movement in a radial direction (arrow II) relative to the wheel 10.

The device functions as follows.

The tangential actuating module 202 and the radial actuating module 203 are controlled by alternating addressing or control signals. The addressing signals are dephased such that the driving element 250 is displaced according to a hysteresis movement. The hysteresis movement of the driving tooth 250 alternates the driving (arrow I) and actuating (arrow II) phases. The driving element 250 meshes with the successive teeth of the wheel 10 and drives the latter according to a step-by-step rotation movement.

It is evident that the lateral flexibility of each of the blades 212 and 210 permits deformation of the latter under the action of the other blade. The two flexible radial and tangential 212 and 214 blades ensure mechanical decoupling of the modules 202 and 203. In fact, the flexibility of the blades allows displacement of the driving element 250 independently according to at least two elementary degrees of freedom, specifically: in the two directions of radial and tangential translation.

The invention claimed is:

1. A device comprising an element to be driven, a driving element to be engaged with the element to be driven and an actuating element adapted to move the driving element so that it drives the element to be driven according to a step-by-step movement, the driving element and the actuating element being formed by etching in a wafer made of semiconductor material, additionally comprising an elastic prestressing device constantly biasing the driving element towards the element to be driven and maintaining contact between the driving element and the element to be driven such that during a first alternation, the driving element meshes with the element to be driven to drive the element to be driven, and during a second alternation in an opposite direction of the first alternation, the driving element slides on the element to be driven.

2. The device according to claim 1, wherein the elastic prestressing device extends between the actuating element and the driving element.

3. The device according to claim 2, wherein the elastic prestressing device comprises a flexible blade connecting the driving element to the actuating element.

4. The device according to claim 3, comprising a support on which the wafer and the element to be driven are arranged.

5. The device according to claim 4, comprising positioning pins fixed on the support to allow positioning of the wafer on the support.

6. The device according to claim 5, wherein the wafer is arranged in support on positioning pins.

7. The device according to claim 6, wherein the wafer comprises at least one notch formed on an edge of the wafer, the notch for receiving a positioning pin for positioning the wafer on the support.

8. The device according to claim 7, in which the actuating element comprises a first actuating module adapted to move the driving element according to a first direction to cause the element to be driven and a second actuating module adapted to move the driving element in a second direction to move the driving element away from the element to be driven, the actuating modules being simultaneously controllable to generate combined hysteresis movement of the driving element.

9. The device according to claim 8, wherein the second actuating module comprises an electrode and a flexible rod, the electrode controllable to deform the flexible rod to shift the driving element in a second direction to move the driving element away from the element to be driven.

10. The device according to claim 9, wherein the electrode has a convex lateral surface, extending opposite a portion of the flexible blade.

11. The device according to claim 10, wherein the second actuating module comprises a series of stops arranged along a lateral surface of the electrode, the stops suitable to prevent contact between the blade and the electrode.

12. Process for installing a device, comprising arranging on the same support:
an element to be driven,
a wafer made of semiconductor material in which are formed by etching a driving element engageable with the element to be driven and an actuating element adapted to move the driving element so that it drives the element to be driven according to a step-by-step movement relative to the support, additionally comprising constantly biasing the driving element towards the element to be driven with an elastic prestressing device and maintaining contact between the driving element and the element to be driven such that during a first alternation, the driving element meshes with the element to be driven to drive the element to be driven, and during a second alternation in an opposite direction of the first alternation, the driving element slides on the element to be driven.

13. The process according to claim 12, wherein the device comprises positioning pins fixed on the support, the process comprising:
arranging the wafer in support on positioning pins.

14. The process according to claim 13, wherein the wafer comprises at least one notch formed on an edge of the wafer, the process comprising:
arranging a positioning pin in the notch to position the wafer on the support.

15. The device according to claim 10, wherein the convex lateral surface is parabolic.

16. The device according to claim 1, wherein the elastic prestressing device comprises a flexible blade connecting the driving element to the actuating element.

17. The device according to claim 1, comprising a support on which the wafer and the element to be driven are arranged.

18. The device according to claim 17, comprising positioning pins fixed on the support to allow positioning of the wafer on the support.

19. The device according to claim 18, wherein the wafer is arranged in support on positioning pins.

20. The device according to claim 19, wherein the wafer comprises at least one notch formed on an edge of the wafer, the notch for receiving a positioning pin for positioning the wafer on the support.

21. The device according to claim 1, in which the actuating element comprises a first actuating module adapted to move the driving element according to a first direction to cause the element to be driven and a second actuating module adapted to move the driving element in a second direction to move the driving element away from the element to be driven, the actuating modules being simultaneously controllable to generate combined hysteresis movement of the driving element.

22. The device according to claim 21, wherein the second actuating module comprises an electrode and a flexible rod, the electrode controllable to deform the flexible rod to shift the driving element in a second direction to move the driving element away from the element to be driven.

23. The device according to claim 22, wherein the electrode has a convex lateral surface, extending opposite a portion of the flexible blade.

24. The device according to claim 22, wherein the second actuating module comprises a series of stops arranged along a lateral surface of the electrode, the stops suitable to prevent contact between the blade and the electrode.

25. The device according to claim 1 wherein the elastic prestressing device is flexed in a direction opposite the element to be driven and the flexed elastic prestressing device biases the driving element toward contact with the element to be driven.

26. The device according to claim 1 wherein the elastic prestressing device is prestressed toward the element to be driven to maintain the drive element in contact with the element to be driven.

27. The device according to claim 1 wherein the elastic prestressing device absorbs positioning defects of the driving element relative to the element to be driven.

28. The device according to claim 1, further comprising an indexing element, wherein during the second alternation the indexing element prevents rotation of the element to be driven in an inverse direction.

29. The device according to claim 28, wherein the indexing element extends from a flexible blade extending in a tangential direction relative to the element to be driven.

* * * * *